US006942829B2

(12) United States Patent
Drabeck, Jr. et al.

(10) Patent No.: US 6,942,829 B2
(45) Date of Patent: Sep. 13, 2005

(54) POLYMER-WOOD COMPOSITES AND ADDITIVE SYSTEMS THEREFOR

(75) Inventors: Gerald W. Drabeck, Jr., Ravenna, OH (US); Juan Bravo, Copley, OH (US); Michael DiPierro, Gurnee, IL (US); Anna C. Andrews, Medina, OH (US); James M. McKinney, North Brunswick, NJ (US); Brenda Hollo, Broadview Heights, OH (US); Deenadayalu Chundury, Newburgh, IN (US)

(73) Assignee: Ferro Corporation, Cleveland, OH (US)

( * ) Notice: Subject to any disclaimer, the term of this patent is extended or adjusted under 35 U.S.C. 154(b) by 116 days.

(21) Appl. No.: 10/426,943

(22) Filed: Apr. 30, 2003

(65) Prior Publication Data

US 2004/0220299 A1 Nov. 4, 2004

(51) Int. Cl.[7] ........................ B28B 3/20; B29C 47/00

(52) U.S. Cl. ........................ 264/176.1; 524/9; 524/13; 524/15; 524/16; 524/275; 524/277; 524/310; 524/313; 524/315

(58) Field of Search ........................ 264/176.1; 524/9, 524/13, 15, 16, 275, 277, 310, 313, 315

(56) References Cited

U.S. PATENT DOCUMENTS 3,943,079 A * 3/1976 Hamed ........................ 524/14
6,337,138 B1 * 1/2002 Zehner et al. .............. 428/511
2003/0229160 A1 12/2003 Williams et al. .............. 524/13

FOREIGN PATENT DOCUMENTS

WO PCT/US02/11787 10/2002

* cited by examiner

*Primary Examiner*—James J. Seidleck
*Assistant Examiner*—U. K Rajguru
(74) *Attorney, Agent, or Firm*—Rankin, Hill, Porter & Clark LLP

(57) ABSTRACT

The present invention provides a method of forming a polymer-wood composite structure and additive systems for use therein. The method of the invention includes extruding a heated mixture that includes from about 20% to about 80% by weight of a thermoplastic polymer, from about 20% to about 80% by weight of a cellulosic filler material, and from about 0.1% to about 10% by weight of an additive system. The additive system according the invention includes a blend of from about 10% to about 90% by weight of a nonionic compatibilizer having an HLB value of from about 9 to about 19 and from about 10% to about 90% by weight of a lubricant. Use of the method and additive system according to the invention facilitates the production of highly filled polymer-wood composite structures at a very high output rate while maintaining commercially acceptable surface appearance. Moreover, the method and additive system according to the invention facilitate the reprocessing of scrap material generated during the production of polymer-wood composite structures without degrading the surface appearance of the polymer-wood composite structures.

20 Claims, No Drawings

POLYMER-WOOD COMPOSITES AND ADDITIVE SYSTEMS THEREFOR

BACKGROUND OF THE INVENTION

1. Field of Invention

The present invention relates to a method of forming polymer-wood composite structures and additive systems for use therein.

2. Description of Related Art

For many years, thermoplastic polymers have been melt-mixed with cellulosic filler materials such as saw dust and extrusion molded to form composite "plastic wood" or "synthetic lumber" products (hereinafter generally referred to as "polymer-wood composites"). Structures (e.g., deck boards) formed of polymer-wood composites tend to be lighter in weight and significantly more moisture resistant than similarly sized structures formed solely of natural wood. In addition, polymer-wood composite structures can be formed from recycle streams of thermoplastic polymers and cellulosic fillers, which helps reduce the demand for natural wood and virgin polymer and thus aids in resource conservation.

The output rate determinative step in the production of polymer-wood composite structures is the rate at which such material can be extruded. If the extrusion rate is too high, the surface appearance of the resultant structure tends to be commercially unacceptable. In order to be commercially acceptable, the surface of a polymer-wood composite structure must be smooth, so as to approximate the surface of natural wood.

A variety of internal and external lubricants and/or release agents are used in production of polymer-wood composite structures in an effort to increase output rate. The most commonly used lubricant package in polymer-wood composites is a combination of a metal stearate, typically zinc stearate, and a synthetic wax, typically ethylene-bis-stearamide (hereinafter "EBS") wax. This conventional lubricant package allows for an acceptable output rate and a commercially acceptable surface appearance.

While the use of a zinc stearate/EBS wax lubricant package does facilitate an increase in extrusion molding output rate, it also presents certain disadvantages. For example, there is a significant amount of scrap material generated during the production of polymer-wood composite structures. Ideally, this material would simply be reprocessed. However, scrap material containing zinc stearate/EBS wax cannot be reprocessed without creating an unacceptable surface appearance in the resulting polymer-wood composite structure. Moreover, the output rate provided by zinc stearate/EBS wax lubricant package is not optimal. Thus, there remains substantial room for improvement in the art.

BRIEF SUMMARY OF THE INVENTION

The present invention provides a method of forming a polymer-wood composite structure, polymer-wood composite structures formed according to the method and additive systems for use therein. The method of the invention comprises extruding a heated mixture that comprises from about 20% to about 80% by weight of a thermoplastic polymer, from about 20% to about 80% by weight of a cellulosic filler material, and from about 0.1% to about 10% by weight of an additive system. The additive system according the invention comprises a blend of from about 10% to about 90% by weight of a nonionic compatibilizer having an HLB value of from about 9 to about 19 and from about 10% to about 90% by weight of a lubricant.

Use of the method and additive system according to the invention facilitates the production of highly filled polymer-wood composite structures at very high output rates while at the same time ensuring that such structures exhibit a commercially acceptable surface appearance. Moreover, the method and additive system according to the invention facilitate the reprocessing of scrap material generated during the production of polymer-wood composite structures without degrading the surface appearance of the resultant polymer-wood composite structures.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

As noted above, the method of the invention comprises extruding a heated mixture that comprises from about 20% to about 80% by weight of a thermoplastic polymer, from about 20% to about 80% by weight of a cellulosic filler material, and from about 0.1% to about 10% by weight of an additive system. Each of these components is separately discussed below.

Thermoplastic Polymer

Virtually any thermoplastic polymer can be used in accordance with the present invention. Suitable thermoplastic polymers include, for example, polyamides, vinyl halide polymers, polyesters, polyolefins, polyphenylene sulfides, polyoxymethylenes and polycarbonates. The thermoplastic polymer component of the mixture can comprise a single homopolymer or copolymer, or a combination of two or more different homopolymers or copolymers. The primary requirement for the thermoplastic polymer is that it retain sufficient thermoplastic properties to permit melt blending with the cellulosic filler material and permit effective formation into shaped articles by conventional extrusion molding processes. Thus, minor amounts of thermosetting polymers may also be included in the mixture provided that the essential properties are not adversely affected. Both virgin and recycled (post-consumer and/or reprocessed scrap) polymers can be used. In view of cost and ease of processing, polyolefins are presently the preferred thermoplastic polymers for use in the invention.

As used herein, the term polyolefin refers to homopolymers, copolymers and modified polymers of unsaturated aliphatic hydrocarbons. Polyethylene and polypropylene are the most preferred polyolefins for use in the invention. High-density polyethylene (HDPE) is particularly preferred and, for economic and environmental reasons, regrinds of HDPE from bottles and film are most particularly preferred.

The mixture preferably comprises from about 20% to about 80% by weight of one or more thermoplastic polymers. More preferably, the mixture comprises from about 40% to about 70% by weight of one or more thermoplastic polymers. In the presently most preferred embodiment of the invention, the mixture comprises from about 50% to about 60% by weight of one or more thermoplastic polymers, most preferably HDPE.

CELLULOSIC FILLER MATERIAL

The cellulosic filler material component may comprise reinforcing (high aspect ratio) fillers, non-reinforcing (low aspect ratio) fillers, and combinations of both reinforcing and non-reinforcing fillers. The term "aspect ratio" refers to the ratio of the length of the filler particle to the effective diameter of the filler particle. High aspect ratio fillers offer an advantage, that being a higher strength and modulus for the same level of filler content.

The use of cellulosic filler materials is advantageous for several reasons. Cellulosic filler materials can generally be obtained at relatively low cost. Cellulosic filler materials are relatively light in weight, can maintain a high aspect ratio after processing in high intensity thermokinetic mixers and exhibit low abrasive properties (thus, extending machine life).

The cellulosic filler material may be derived from any cellulose source, including wood/forest and agricultural by-products. Thus, the cellulosic filler material may comprise, for example, hard wood fiber, soft wood fiber, hemp, jute, rice hulls, wheat straw, and combinations of two or more of these.

In some applications, it may be desirable for the cellulosic filler material to comprise a blend of a major portion of a high aspect ratio fiber, such as a hard wood fiber, and a minor portion of a low aspect ratio fiber. Throughout the specification and in the appended claims, the term "major portion" means 50% or more by weight and "minor portion" means less than 50% by weight. It will be appreciated that high aspect ratio fibers are generally more difficult to process and therefore may be less desirable in some applications in which processing speed and efficiency are particularly important considerations.

The mixture preferably comprises from about 20% to about 80% by weight of one or more cellulosic filler materials. More preferably, the mixture comprises from about 25% to about 60% by weight of one or more cellulosic filler materials. In the presently most preferred embodiment of the invention, the mixture comprises from about 30% to about 50% by weight of one or more cellulosic filler materials, most preferably oak wood fiber.

Inorganic fillers, such as glass fibers, carbon fibers, talc, mica, kaolin, calcium carbonate and the like, may also be included as an optional supplement to the cellulosic filler material. In addition, other organic fillers, including polymeric fiber, may also be used. The total filler content of the mixture (i.e., the sum of all cellulosic filler materials and other inorganic and/or organic fillers) preferably does not exceed 80% of the mixture by weight.

Additive System

The additive system according to the invention comprises a blend of from about 10% to about 90% by weight of a nonionic compatibilizer having an HLB value of from about 9 to about 19 and from about 10% to about 90% by weight of a lubricant.

Nonionic Compatibilizer

The term "nonionic compatibilizer" refers to an uncharged molecule that includes a hydrophobic (i.e., lipophilic) domain and a hydrophilic (i.e. lipophobic) domain. Nonionic compatibilizers are usually the reaction product of an alkylene oxide, typically ethylene oxide, with a fatty alcohol, fatty acid, alkylphenol, alkylamine or other appropriate compound having at least one active hydrogen atom. Typically, the fatty alcohols, acids and amines will have a carbon chain length in the range of from $C_3$ to $C_{18}$. Typically, the number of polyoxyethylene ("POE") repeat units in the chain will be from about 2 to about 200. Preferred nonionic compatibilizers for use in the invention include alcohol ethoxylates, alkylphenol ethoxylates and alkyl polyglycosides (e.g., sorbitan esters).

It is critical that the nonionic compatibilizer have an HLB value from about 9 to about 19. HLB stands for hydrophilic-lipophilic balance. Nonionic compatibilizers with a low HLB are more lipophilic, whereas those with a high HLB are more hydrophilic. The HLB system, which was developed by William C. Griffin in 1949, is well known. The following equation was suggested by Griffin for polyhydric alcohol, fatty acid esters:

$$HLB=20(1-S/A)$$

where S is the saponification number of the ester and A is the acid number of the acid.

In some cases, particularly where an accurate determination of the saponification number is difficult to obtain, the following equation is used:

$$HLB=(E+P)/5$$

where E is the weight percent of oxyethylene and P is the weight percent of polyhydric alcohol. When ethylene oxide is the only hydrophilic group present the equation is reduced to HLB=E/5.

HLB values for various nonionic compatibilizers are widely reported in the literature and by manufacturers. HLB values for some common non-ionic compatibilizers are listed in Table 1 below:

TABLE 1

| Non-Ionic Compatibilizer | HLB value |
|---|---|
| Glycerol monostearate | 3.8 |
| Diglycerol monostearate | 5.5 |
| Tetraglycerol monostearate | 9.1 |
| Succinic acid ester of monoglycerides | 5.3 |
| Diacetyl tartaric acid ester of monoglycerides | 9.2 |
| Sodium stearoyl-2-lactylate | 21 |
| Sorbitan tristerate | 2.1 |
| Sorbitan monostearate | 4.7 |
| Sorbitan monooleate | 4.3 |
| Polyoxyethylene sorbitan monostearate | 14.9 |

TABLE 1-continued

| Non-Ionic Compatibilizer | HLB value |
|---|---|
| Propylene glycol monostearate | 3.4 |
| Polyoxyethylene sorbitan monooleate | 15 |

The presently most preferred nonionic compatibilizers for use in the invention includes sorbitan esters of fatty acids, polyalkoxylated sorbitan esters of fatty acids, polyalkoxylated fatty alcohols, polyethylene glycol esters of oleic acid and tall oil esters. Specific nonionic compatibilizers suitable for use in the invention include: POE 20 sorbitan monolaurate (HLB=16.7); POE 4 sorbitan monolaurate (HLB=13.3); POE 20 sorbitan monooleate ("ESMO") (HLB=15.0); POE 20 sorbitan trioleate ("ESTO") (HLB=11.0); POE 10 stearyl ether (HLB=12.4); POE 20 stearyl ether (HLB=15.3); POE 100 stearyl ether (HLB=18.8); POE 40 castor oil (triricinoleoyl glycerol) (HLB=13.6); POE 7.5 nonylphenyl ether (HLB=12.2); POE 9 nonylphenyl ether (HLB=13.0); POE 12 nonylphenyl ether (HLB=14.2); and polyethyleneglycol ("PEG") monostearate (HLB=17.0).

Lubricant

The lubricant component of the additive system is preferably lipophilic. Suitable lubricants for use in the invention include, but are not limited to, carboxyamide waxes, fatty acid esters, fatty alcohols, fatty acids or metal salt of fatty acids, waxes, polyunsaturated oils, castor oil, and mineral oils. Hydrogenated castor oil and glycerol monooleate ("GMO") are preferred, with hydrogenated castor oil being presently most preferred.

The combination of a compatibilizer having an HLB value of from about 9 to about 19 with a lipophilic lubricant provides an unexpected snyergistic increase in the rate at which the polymer-wood composite mixture may be extruded without degrading the surface appearance of the resulting polymer-wood composite structure. It is hypothesized that this unexpected synergy is the result of the presence of additives that exhibiting both high and low polar moieties. Cellulosic filler materials generally have a significant degree of polarity whereas most thermoplastic resins, such as HDPE for example, have little or none. Thus, the additive system according to the invention provides a balance that facilitates the maximum output without detrimentally affecting surface appearance.

Another surprising result obtained through the use of the additive system according to the invention is the ability to reprocess scrap material without observing a decline in surface appearance of the resulting polymer-wood composite structure. If necessary, additional amounts of the additive system can be added during melt mixing in the extruder.

As noted above, the additive system according to the invention comprises a blend of from about 10% to about 90% by weight of a nonionic compatibilizer having an HLB value of from about 9 to about 19 and from about 10% to about 90% by weight of a lubricant. More preferably, the additive system comprises from about 20% to about 60% by weight of one or more nonionic compatibilizer and from about 40% to about 80% by weight of one or more lubricants.

The loading of the additive system in the mixture is typically from about 0.1% to about 10% by weight of the mixture. Amounts greater than 10% can be used without adverse consequences, but use of such amount does not produce significant improvements in output rate or surface quality and simply adds to the cost of the final product. Loadings of from about 2% to about 8% by weight of the mixture are optimal in most applications.

The present invention also provides a method of forming a polymer-wood composite structure. The method comprises heating a mixture comprising from about 20% to about 80% by weight of a thermoplastic polymer, from about 20% to about 80% by weight of a cellulosic filler material and from about 0.1% to about 10% by weight of an additive system, extruding the heated mixture through a die to form the structure and cooling the structure. Alternatively, the heated mixture can be used to form structures by injection molding. Extrusion is preferred.

Polymer-wood composite structures formed in accordance with the invention can be used in place of natural wood structures in a variety of applications, provided that the strength requirements of the application do not exceed the physical properties of the polymer-wood composite structure. Exemplary structures include, for example, outdoor decking and planking, dimensional lumber, decorative moldings, picture frames, furniture, window moldings, window components, door components and roofing systems.

The following examples are intended only to illustrate the invention and should not be construed as imposing limitations upon the claims.

EXAMPLE 1

The amounts of the various components shown in weight percent in Table 2 below were melt mixed together in a Leistritz 18 mm counter rotating extruder at a temperature of 174° F. and then extruded through a rectangular 0.125"×0.375" die to form a lab test sample structure 0.125" thick and 0.375" wide (the length of the samples varied). The composition identified in Table 2 as "Standard" is typical of formulations presently used in the polymer-wood composite industry. The composition identified in Table 2 as "Sample 1" includes only a nonionic compatibilizer. The composition identified in Table 2 as "Sample 2" includes only a lubricant. The composition identified in Table 2 as "Sample 3" includes a combination of a nonionic compatibilizer and a lubricant in accordance with the present invention.

TABLE 2

| Component | Standard | Sample 1 | Sample 2 | Sample 3 |
|---|---|---|---|---|
| HDPE | 54 | 54 | 54 | 54 |
| Oak wood fiber | 40 | 40 | 40 | 40 |
| EBS | 2.7 | — | — | — |
| Zinc stearate | 1.8 | — | — | — |
| ESMO HLB = 15 | — | 4.5 | | 1.8 |
| Hydrogenated castor oil | — | — | 4.5 | 2.7 |
| Iron oxide | 1.5 | 1.5 | 1.5 | 1.5 |
| Total | 100.00 | 100.00 | 100.00 | 100.00 |
| Output/amps | 7.59 | 18.90 | 8.20 | 29.20 |
| Surface quality | acceptable | excellent | poor | excellent |

The results shown in Table 2 above demonstrate that only the combination of a nonionic compatibilizer and lubricant produce an increase in output rate without adversely affecting the surface quality of the resultant polymer-wood composite structure. Output/amps measures the efficiency of the extrusion process. It is desirable to have maximum output rate while minimizing the amps required for the particular output. In all examples, surface quality determinations were made by examining the surface appearance of the extruded material and assigning a grade according to the following scale: surfaces that were very smooth and glossy were deemed "excellent"; surfaces that were smooth with a rare nick on the edge were deemed "acceptable"; surfaces that had many nicks or jagged edges were deemed "poor"; and surfaces that were deeply jagged on the edges were deemed "very poor."

EXAMPLE 2

The amounts of the various components shown in weight percent in Table 3 below were melt mixed together and extruded to form a polymer-wood composite structure as described in Example 1 above. The composition identified in Table 3 as "Standard" is typical of formulations presently used in the polymer-wood composite industry. The composition identified in Table 3 as "Sample 4" includes only a nonionic compatibilizer. The composition identified in Table 3 as "Sample 5" includes only a lubricant. The composition identified in Table 3 as "Sample 6" includes a combination of a nonionic compatibilizer and a lubricant in accordance with the present invention.

TABLE 3

| Component | Standard | Sample 4 | Sample 5 | Sample 6 |
|---|---|---|---|---|
| HDPE | 54 | 54 | 54 | 54 |
| Oak wood fiber | 40 | 40 | 40 | 40 |
| EBS | 2.7 | — | — | — |
| Zinc stearate | 1.8 | — | — | — |
| ESMO HLB = 15 | — | 4.5 | | 1.8 |

TABLE 3-continued

| Component | Standard | Sample 4 | Sample 5 | Sample 6 |
|---|---|---|---|---|
| GMO | — | — | 4.5 | 2.7 |
| Iron oxide | 1.5 | 1.5 | 1.5 | 1.5 |
| Total | 100.00 | 100.00 | 100.00 | 100.00 |
| Output/amps | 7.59 | 18.90 | 14.60 | 21.50 |
| Surface quality | acceptable | excellent | excellent | excellent |

The results shown in Table 3 above again demonstrate that only the combination of a nonionic compatibilizer and lubricant (this time GMO) produce an increase in output rate without adversely affecting the surface quality of the resultant polymer-wood composite structure.

EXAMPLE 3

The amounts of the various components shown in weight percent in Table 4 below were melt mixed together and extruded to form a polymer-wood composite structure as described in Example 1 above. The composition identified in Table 4 as "Standard" is typical of formulations presently used in the polymer-wood composite industry. Samples 7 through 11 each include the same loading of a non-ionic compatibilizer having an HLB value of 8.6, 11, 17, 19 and >19, respectively.

TABLE 4

| Component | Standard | Sample 7 | Sample 8 | Sample 9 | Sample 10 | Sample 11 |
|---|---|---|---|---|---|---|
| HDPE | 54 | 54 | 54 | 54 | 54 | 54 |
| Oak wood fiber | 40 | 40 | 40 | 40 | 40 | 40 |
| EBS | 2.7 | — | — | — | — | — |
| Zinc stearate | 1.8 | — | — | — | — | — |
| Sorbitan monolaurate (HLB = 8.6) | — | 1.8 | — | — | — | — |
| ESTO (HLB = 11) | — | — | 1.8 | — | — | — |
| PEG monostearate (HLB = 17) | — | — | — | 1.8 | — | — |
| Ethoxylated sorbitan monolaurate (HLB = 19) | — | — | — | — | 1.8 | — |
| PEG 8000 MW (HLB > 19) | — | — | — | — | — | 1.8 |
| Hydrogenated castor oil | — | 2.7 | 2.7 | 2.7 | 2.7 | 2.7 |
| Iron oxide | 1.5 | 1.5 | 1.5 | 1.5 | 1.5 | 1.5 |
| Total | 100 | 100 | 100 | 100 | 100 | 100 |
| Output/amps | 7.59 | 23.20 | 29.20 | 31.90 | 30.40 | 24.80 |
| Surface quality | acceptable | very poor | excellent | excellent | acceptable | very poor |

The results shown in Table 4 above again demonstrate that the HLB of the nonionic compatibilizer needs to be within the range of from about 9 to about 19 in order to obtain the desired high output rate and commercially acceptable surface appearance in a resulting polymer-wood composite structure.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A method of forming a polymer-wood composite structure, the method comprising:

heating a mixture comprising:

from about 20% to about 80% by weight of a thermoplastic polymer;

from about 20% to about 80% by weight of a cellulosic filler material; and from about 0.1% to about 10% by weight of an additive system comprising a blend of:

from about 10% to about 90% by weight of a nonionic compatibilizer having an HLB value of from about 9 to about 19; and from about 10% to about 90% by weight of a lubricant;

extruding the heated mixture through a die to form the structure; and cooling the structure.

2. The method according to claim 1 wherein the thermoplastic polymer comprises one or more selected from the group consisting of polyamides, vinyl halide polymers, polyesters, polyolefins, polyphenylene sulfides, polyoxymethylenes and polycarbonates.

3. The method according to claim 1 wherein the thermoplastic polymer comprises polypropylene and/or polyethylene.

4. The method according to claim 1 wherein the thermoplastic polymer comprises recycle grade high-density polyethylene.

5. The method according to claim 1 wherein the cellulosic filler material comprises one or more selected from the group consisting of hard wood fiber, soft wood fiber, hemp, jute, rice hulls and wheat straw.

6. The method according to claim 1 wherein the cellulosic filler material comprises a major portion of high aspect ratio wood fiber and a minor portion of low aspect ratio wood fiber.

7. The method according to claim 1 wherein the mixture further comprises one or more inorganic fillers and/or one or more non-cellulosic organic fillers.

8. The method according to claim 1 wherein the nonionic compatibilizer comprises one or more selected from the group consisting of sorbitan esters of fatty acids, polyalkoxylated sorbitan esters of fatty acids, polyalkoxylated fatty alcohols, polyethylene glycol esters of oleic acid and tall oil esters.

9. The method according to claim 1 wherein the nonionic compatibilizer comprises one or more selected from the group consisting of POE 20 sorbitan monolaurate, POE 4 sorbitan monolaurate, POE 20 sorbitan monooleate, POE 20 sorbitan trioleate, POE 10 stearyl ether, POE 20 stearyl ether, POE 100 stearyl ether, POE 40 castor oil, POE 7.5 nonylphenyl ether, POE 9 nonylphenyl ether, POE 12 nonylphenyl ether, and polyethyleneglycol monostearate.

10. The method according to claim 1 wherein the lubricant comprises one or more selected from the group consisting of carboxyamide waxes, fatty acid esters, fatty alcohols, fatty acids, metal salts of fatty acids, waxes, polyunsaturated oils, castor oil, and mineral oil.

11. The method according to claim 1 wherein the lubricant comprises hydrogenated castor oil.

12. The method according to claim 1 wherein the mixture comprises previously extruded polymer-wood composite scrap material that is being reprocessed.

13. A method of forming a polymer-wood composite structure, the method comprising:

heating a mixture comprising:

from about 40% to about 70% by weight of a high-density polyethylene;

from about 25% to about 60% by weight of a cellulosic filler material; and from about 2% to about 8% by weight of an additive system comprising a blend of:

from about 20% to about 60% by weight of a nonionic compatibilizer having an HLB value of from about 9 to about 19; and from about 40% to about 80% by weight of a lubricant;

extruding the heated mixture through a die to form the structure; and cooling the structure.

14. The method according to claim 13 wherein the nonionic compatibilizer comprises a polyalkoxylated sorbitan ester of a fatty acid.

15. The method according to claim 14 wherein the lubricant comprises hydrogenated castor oil.

16. A method of forming a polymer-wood composite structure, the method comprising:

heating a mixture comprising:

from about 50% to about 60% by weight of polyethylene;

from about 30% to about 50% by weight of a cellulosic filler material; and from about 2% to about 8% by weight of an additive system comprising a blend of:

from about 20% to about 60% by weight of a nonionic compatibilizer having an HLB value of from about 9 to about 19; and from about 40% to about 80% by weight of a lubricant;

extruding the heated mixture through a die to form the structure; and cooling the structure.

17. The method according to claim 16 wherein the nonionic compatibilizer comprises one or more selected from the group consisting of sorbitan esters of fatty acids, polyalkoxylated sorbitan esters of fatty acids, polyalkoxylated fatty alcohols, polyethylene glycol esters of oleic acid and tall oil esters.

18. The method according to claim 16 wherein the nonionic compatibilizer comprises one or more selected from the group consisting of POE 20 sorbitan monolaurate, POE 4 sorbitan monolaurate, POE 20 sorbitan monooleate, POE 20 sorbitan trioleate, POE 10 stearyl ether, POE 20 stearyl ether, POE 100 stearyl ether, POE 40 castor oil, POE 7.5 nonylphenyl ether, POE 9 nonylphenyl ether, POE 12 nonylphenyl ether, and polyethylene glycol monostearate.

19. The method according to claim 16 wherein the lubricant comprises one or more selected from the group consisting of carboxyamide waxes, fatty acid esters, fatty alcohols, fatty acids, metal salts of fatty acids, waxes, polyunsaturated oils, castor oil, and mineral oil.

20. The method according to claim 16 wherein the lubricant comprises hydrogenated castor oil.

* * * * *